(12) United States Patent
Taubenberger et al.

(10) Patent No.: US 6,406,059 B1
(45) Date of Patent: Jun. 18, 2002

(54) INFLATABLE SAFETY BELT FOR MOTOR VEHICLES

(75) Inventors: Josef Taubenberger, Bruckmuehl; Friedrich Ritzl, Geretsried; Klaus Kompass, Scheyern; Klaus Werkmeister, Langenbach; Markus Meister, Munich; Hans Peter Sertl, Kemnath, all of (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 09/832,000

(22) PCT Filed: Oct. 2, 1999

(86) PCT No.: PCT/EP99/07323

§ 371 (c)(1),
(2), (4) Date: Aug. 20, 2001

(87) PCT Pub. No.: WO00/29260

PCT Pub. Date: May 25, 2000

(30) Foreign Application Priority Data

Nov. 12, 1998 (DE) .......................................... 198 52 314

(51) Int. Cl.[7] .................................................. B60R 21/18
(52) U.S. Cl. ....................... 280/733; 280/735; 280/808; 280/801.1
(58) Field of Search ................................ 280/733, 735, 280/808, 801.1

(56) References Cited

U.S. PATENT DOCUMENTS

| 5,383,713 A | * | 1/1995 | Kamiyama et al. |
| 5,393,091 A | | 2/1995 | Tanaka |
| 5,466,003 A | | 11/1995 | Tanaka |
| 5,474,326 A | * | 12/1995 | Cho |
| 5,765,869 A | | 6/1998 | Huber |
| 6,010,151 A | * | 1/2000 | Honda |
| 6,237,946 B1 | * | 5/2001 | Nariyasu |
| 6,276,715 B1 | * | 8/2001 | Takeuchi |

FOREIGN PATENT DOCUMENTS

| DE | 2358070 | 1/1976 |
| DE | 4116162 | 11/1992 |
| DE | 4232041 | 9/1994 |
| EP | 0901945 | 3/1999 |
| FR | 2200813 | 10/1974 |
| FR | 2442058 | 6/1980 |
| JP | 06262994 | 9/1994 |
| WO | 88/07947 | 10/1988 |
| WO | 97/06983 | 2/1997 |
| WO | 98/00314 | 1/1998 |
| WO | 98/51542 | 11/1998 |

* cited by examiner

*Primary Examiner*—Brian L. Johnson
*Assistant Examiner*—Tony Winner
(74) *Attorney, Agent, or Firm*—Crowell & Moring LLP

(57) ABSTRACT

An inflatable seat belt for securing an occupant in a motor vehicle having a belt strap which is divided by way of a belt latch into a diagonal region resting against the occupant's upper body and into a horizontal region resting against the occupant's pelvis. A belt buckle is fastened to the vehicle and the belt latch is detachably connectable with the belt buckle. On the diagonal region of the belt strap, an air bag is mounted which extends from the occupant's upper body to behind the head. The air bag is made of a material which is shortened in an axial direction during inflation. The diagonal region of the belt strap is connected with an upper retractor fastened to the vehicle, and the horizontal region of the belt strap is connected with a lower retractor fastened to the vehicle.

22 Claims, 14 Drawing Sheets

INFLATABLE SAFETY BELT FOR MOTOR VEHICLES

BACKGROUND AND SUMMARY OF THE INVENTION

The invention relates to an inflatable seat belt for securing an occupant in a motor vehicle. The seat belt includes a belt strap, which is divided by way of a belt latch into a diagonal region resting against an occupant's upper body and into a horizontal region resting against the occupant's pelvis. These two ends are connected with the vehicle. The belt strap is connected with the belt latch by a fastener having a defined holding force. A belt buckle is fastened to the vehicle into which the belt latch can be detachably connected. A first retractor is fastened to the vehicle into which the diagonal region of the belt strap is connected. A second retractor is fastened to the vehicle into which the horizontal region of the belt strap is connected. An air bag is fastened to the diagonal region of the belt strap and extends from the occupant's upper body to behind the head. The air bag comprises a material which, during the inflating, is shortened in the axial direction.

An inflatable seat belt is disclosed in International Patent Publication WO 98 00314 A. In this known seat belt, the belt strap is connected with the belt latch by a tear seam, a snap fastener or a button. In the event of an accident and the inflation of the air bag, the connection between the belt strap and the belt latch is opened, so that the horizontal region of the belt strap can be pulled tight. As a result, freedom of movement of the concerned occupant is further limited, and the occupant is prevented from slipping through under the horizontal region of the belt strap. During full brake application, similar high deceleration forces can also occur. The connection between the belt strap and the belt latch can also be opened up. Since this connection is constructed as a destructible fastener, the release or separation process is not reversible. When the belt strap is no longer fixed with respect to the belt latch, the position of the air bag fastened thereon is no longer defined with respect to the occupant. When the seat belt is secured, it is possible that one of the two retractors may wind up too little of the belt strap while the other may wind up too much, with the result that the air bag is arranged too high or too low with respect to the occupant.

In the secured condition of the seat belt, the air bag is arranged too high such that it extends around the deflection fitting, it may be destroyed during the inflating. As a result, the air bag would be ineffective during an impact.

It is an object of the invention to further develop the air bag of the above-mentioned type such that, while the displaceability of the belt strap with respect to the belt latch is maintained, it is ensured that when a defined load is exceeded, in the secured condition of the seat belt, the air bag is always at a defined height.

According to the invention, this object is achieved by providing that the belt strap is connected with the belt latch by a clamping fastener, and the clamping fastener and the first retractor are electrically controllable such that (i) the first retractor as well as the clamping fastener are releasable, (ii) after the withdrawal of a defined length of the belt strap, the first retractor is locked, (iii) after the insertion of the belt latch into the belt buckle, the clamping fastener is locked and the first retractor is released, and (iv) in the event of an impact of the vehicle, the clamping fastener is released.

As a result of these measures, it is ensured that the air bag, or the inflatable region of the seat belt, will always be in the upper position in which the occupant's head is optimally protected. In addition, it is ensured that, for maintaining a maximal head protection, the diagonal region of the belt strap can only be withdrawn from the upper retractor when, after locking the seat belt and the clamping fastener, the occupant moves his upper body toward the front. As soon as the occupant has returned into his rest position, the upper retractor will pull the slack from the diagonal region of the belt strap. The comfort of a conventional three-point system will therefore also be retained.

In a particularly advantageous embodiment of the invention, it is provided that the belt latch is non-displaceably held in the longitudinal direction of the belt strap and the holding system is designed such that it becomes ineffective when a certain axial force in the diagonal region is exceeded. As soon as the axial force exceeds a certain value, the holding system of the belt strap at the belt latch becomes ineffective, and the belt strap is pulled in the longitudinal direction through the belt latch and the horizontal region of the belt strap is tensioned.

The connection of the belt strap with the belt latch, which can be opened up after a certain axial force has been exceeded, can be implemented, for example, in such a manner that the belt strap is sewn to the belt latch. However, it is also possible that the belt strap can be connected with the belt latch by a clamping fastener with a defined holding force.

In a further preferred embodiment of the invention, it is provided that the clamping fastener and the upper retractor, with which the diagonal region of the belt strap is connected, are electrically controllable such that (i) the upper retractor as well as the clamping fastener are released, (ii) after the withdrawal of a defined length of the belt strap, the upper retractor is locked, (iii) after the insertion of the belt latch into the belt buckle, the clamping fastener is locked and the upper retractor will be released, and (iv) in the event of an impact of the vehicle, the clamping mechanism will be released. In this embodiment, it is ensured that the air bag or inflatable region of the seat belt will always be in the upper position in which the occupant's head is optimally protected. In addition, it is ensured that, for maintaining the maximal head protection function, the diagonal region of the belt strap can only be withdrawn from the upper retractor when, after locking the seat belt and the clamping fastener, the occupant moves his upper body toward the front. As soon as the occupant has returned into his rest position, the upper retractor will pull the slack from the diagonal region of the belt strap. The comfort of the three-point seat belt system will therefore be retained.

In a further preferred embodiment of the invention, the belt latch is constantly tightly connected with the belt strap and that a belt tightening device is assigned to the lower retractor.

When the seat belt is released from the occupant, the horizontal region of the belt strap is wound onto the lower retractor so that the belt latch comes to be situated on the seat surface and the region of the belt strap provided with the air bag rests vertically next to the seat on the interior side of the vehicle.

In order to protect an occupant who is not wearing the seat belt in the event of a side impact of the vehicle, it is provided that the gas generator connected with the air bag will be activated when the belt latch is not inserted into the belt buckle. The air bag is inflated by the gas generator so that the occupant not wearing the seat belt will be protected in the head region.

Three-point belt systems cannot be used with small children because of their small body size. As a result, safety functions are achieved by a specifically constructed child seat which is fixed by means of the seat belt with respect to the seat. So that the seat belt according to the invention can also be used in conjunction with such a child seat, according to a further preferred embodiment of the invention, a child seat detection system is provided which, when a child seat is detected, locks the upper retractor and prevents a triggering of the gas generator.

DETAILED DESCRIPTION OF THE DRAWINGS

Figure 1:
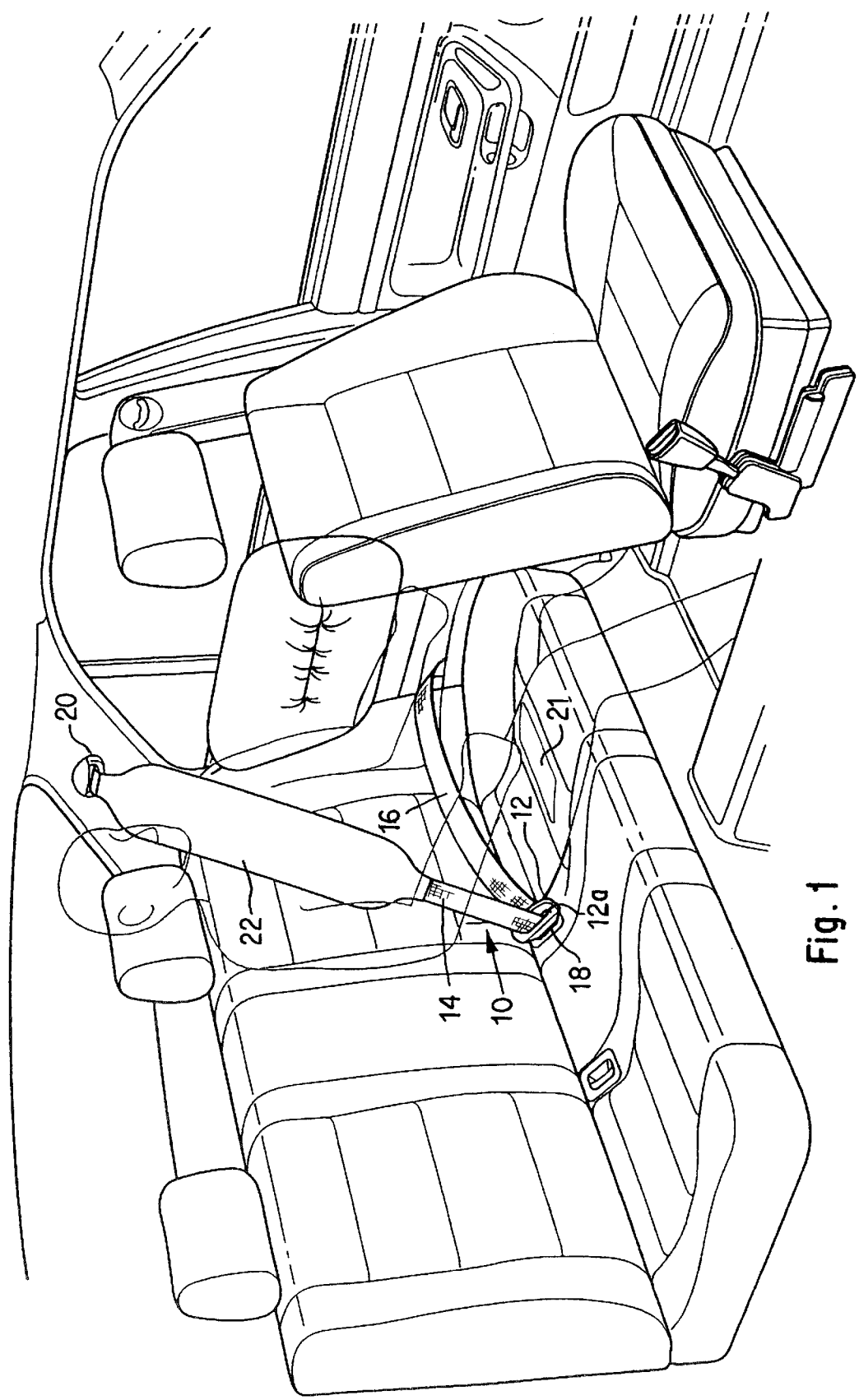
FIG. 1 is a perspective representation of the interior of a passenger car.
Figure 1A:
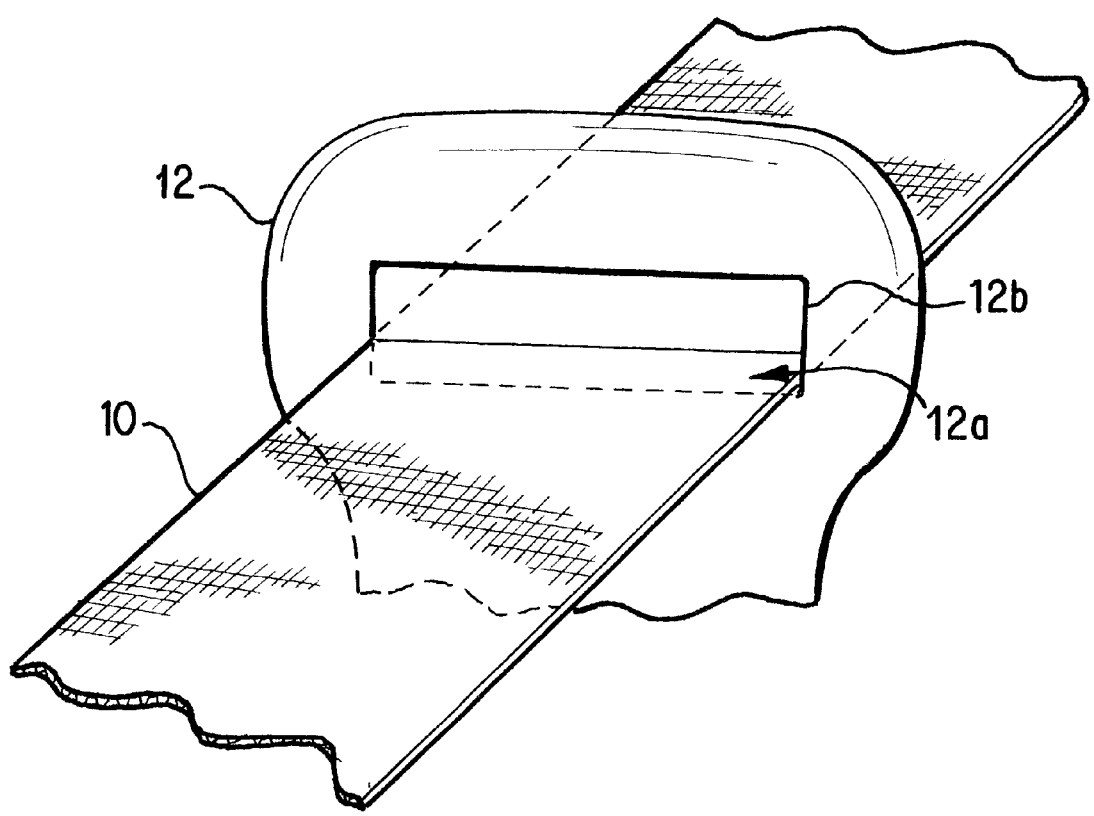
FIG. 1a is an enlarged perspective representation of the latch 12 in FIG. 1.

For purposes of simplification, FIG. 1 only shows a seat belt assigned to a left rear seat. This seat belt comprises a belt strap 10 which, in a known manner, is divided by a belt latch 12 into a diagonal region 14 resting against an occupant's upper body and a horizontal region 16 resting against the occupant's pelvis. In a known manner, the belt latch 12 can be inserted into a belt buckle 18 fastened to the vehicle and can be releasably locked therewith. A clamping fastener 12b, shown schematically in FIG. 1a, is assigned to the guide slot 12a of the belt latch 12, so that the belt strap 10 is normally prevented from carrying out a relative movement with respect to the belt latch 12 and can move with respect to the belt latch only when a defined axial force is exceeded. A free end of the horizontal region 16 of the belt strap 10 is connected with a (not shown) conventional lower retractor which is fastened to the vehicle. The diagonal region 14 of the belt strap 10 is guided around a belt deflection fitting 20 and is connected with a (not shown) upper conventional retractor. The belt deflection fitting 20 is arranged above the head of an occupant having an average height. A hose-shaped air bag 22 is fastened by means of its two ends on the diagonal region 14 of the belt strap 10 and a (not shown) gas line is connected with a gas generator (which is also not shown). The air bag 22 consists of a hose-shaped fabric whose warp threads or weft threads extend approximately diagonally with respect to the longitudinal axis of the air bag 22. By way of this arrangement the air bag 22 is shortened in the axial direction during the inflating, while its diameter increases. In the illustrated embodiment, the belt strap 10 is interrupted by the air bag 22 but can also be constructed in a continuous manner.

When the seat belt is not required and the belt latch 12 is separated from the belt buckle 18, the belt strap 10 is wound up by the upper and the lower retractor. As a result, a defined resting position of the air bag 22 is ensured. When an occupant wants to use the seat belt, he grips the belt latch 12 and pulls it over his pelvis toward the belt buckle 18 in order to lock it with the belt buckle. During this operation, the belt strap 10 is withdrawn only from the lower retractor. However, when the occupant, after he has put on the seat belt, wants to move his upper body forward, this is easily possible because the required length of the belt strap 10 can easily be pulled off the upper retractor. When the occupant then returns to his normal position, the belt strap 10 will be wound up by the upper retractor until the air bag 22 again takes up its position illustrated in FIG. 1.

As noted previously, a child seat detection system 21 (shown schematically in FIG. 1) is provided, to lock the upper retractor and prevent triggering of the gas generator when a child seat is present.

In the event of an impact of the vehicle, the gas generator is triggered in order to inflate the air bag 22, and the two retractors are locked in a known manner against an unwinding of the belt strap 10. As illustrated in FIG. 1, the air bag 22 extends over the occupant's chest upward over the head region. The occupant's head is therefore optimally protected by the air bag 22 against a lateral impact. An additional side air bag for protecting the head is therefore not necessary. Since, during the inflating, the air bag 22 is shortened in the axial direction, an axial force is built up in the diagonal region 14 of the belt strap 10, which axial force exceeds the holding force of the clamping fastener assigned to the belt latch 12. The belt strap 10 therefore starts to move upward with respect to the belt latch 12 until the horizontal region 16 rests absolutely firmly against the occupant's pelvic region and has no more slack. The occupant is therefore held firmly in the seat by the diagonal region 14 and by the horizontal region 16 of the belt strap 10.

These operations take place within a very short time period, before a greater inertia of masses acts upon the occupant. As soon as the occupant starts to move forward under the force of the inertia of masses, he is supported in the chest area by the air bag 22. Under this supporting force, the air bag 22 can change its shape, so that its length increases again. As a result of this increase in length of the air bag 22, the upper body is caught more gently and the deceleration force is reduced.

On the one hand, the described seat belt is characterized by a high operational safety because it is ensured that the air bag 22 is always in a position which is optimal for protecting the head area, and, on the other hand, it is characterized by high comfort because the occupant wearing the seat belt can bend his upper body forward away from the backrest when desired.

Alternatively, the belt deflection fitting and the upper retractor can also be integrated into the seat. Furthermore, the gas feeding hose connecting the gas generator with the air bag must be sufficiently long for following an occupant's forward movement. However, in contrast to the seat belt, the gas feeding hose should not be wound up in the parking position because this would require a very large diameter of the take-up drum. In the following, several embodiments of the connection of the gas generator to the air bag will be explained.

Figure 2:
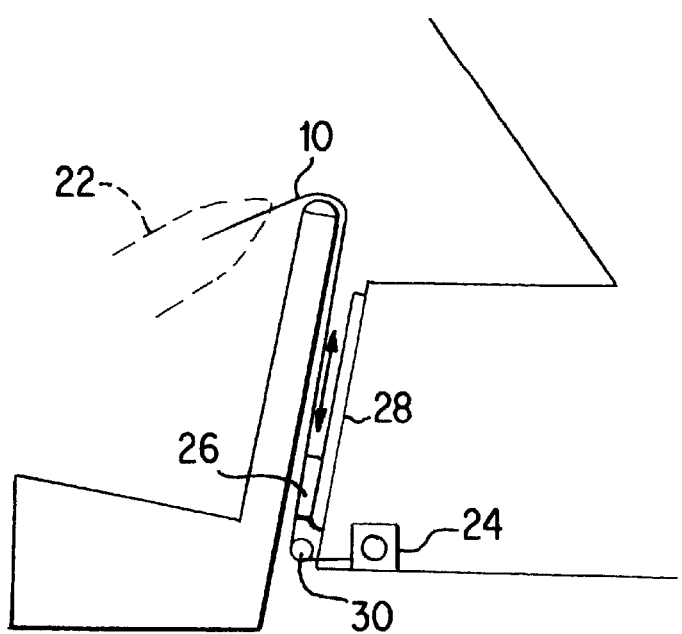
FIG. 2 is a schematic lateral view of a seat with an assigned seat belt and a movably arranged gas generator.

FIG. 2 is a schematic lateral view of a seat with a seat belt, where the gas supply to the air bag takes place from above. A gas feeding hose (not shown) is integrated in the belt strap 10. The belt strap 10 extends behind the backrest downward and is deflected by way of a roller toward the rear to a retractor 24. A gas generator 26 connected with the gas feeding hose is fastened to the belt strap 10, for example, by sewing. Behind the backrest, a guide rail 28 is mounted on which the gas generator 26 is guided displaceably in the direction of the arrow. FIG. 2 shows the normal condition in which the belt strap is rolled up on the retractor 24. When the occupant (not shown) moves forward, the belt strap 10 is withdrawn from the retractor 24 and the gas generator 26 moves upward along the guide rail 28. It is ensured that only the belt strap 10 and not the gas feeding hose connecting the gas generator 26 to the air bag 22 is wound onto the retractor 24.

Figure 3:
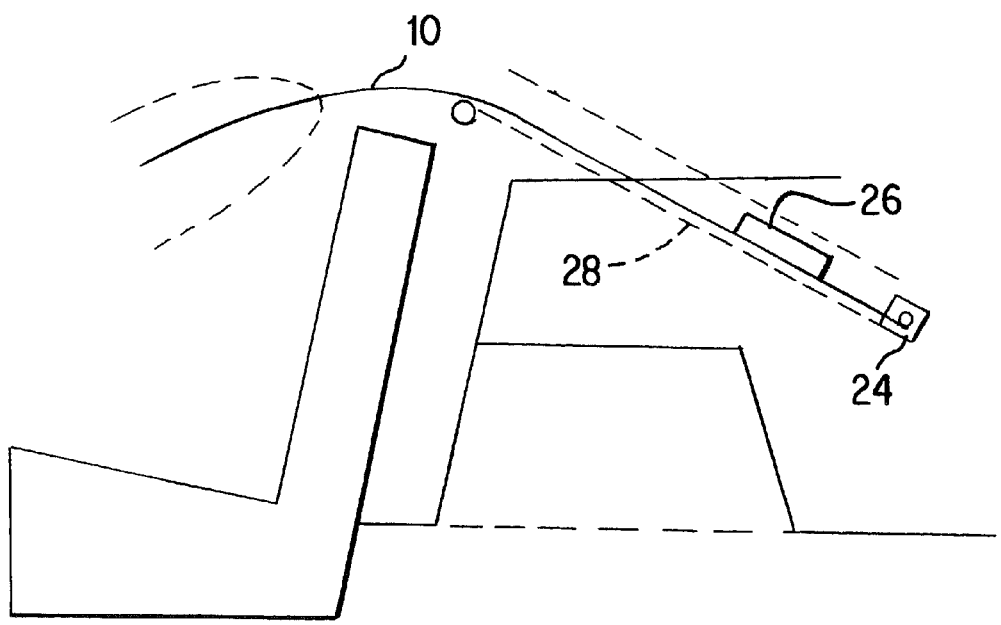
FIG. 3 is a view of a modification of FIG. 2.

FIG. 3 shows a modification of FIG. 2, in which the guide rail 28 and the retractor 24 assigned to the diagonal region of the belt strap 10 are arranged behind the backrest of the rear seat on the rear window shelf or in the trunk.

Figure 4:
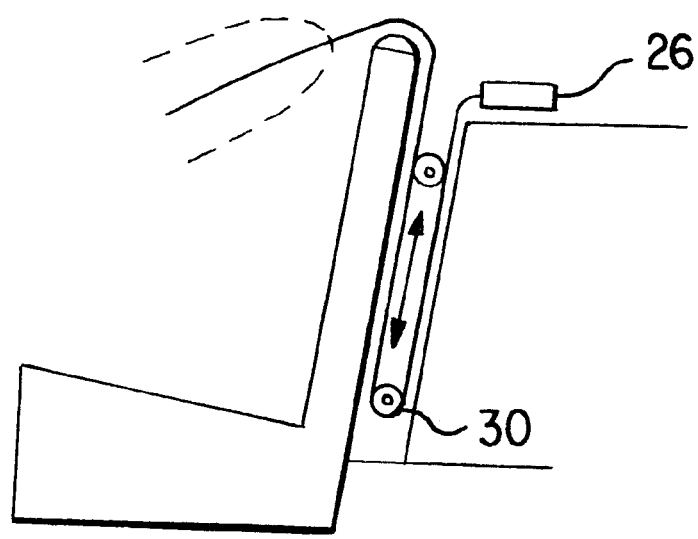
FIG. 4 is a lateral view of a seat with an assigned seat belt and a stationarily arranged gas generator.

In the embodiment illustrated in FIG. 4, the gas feeding hose is also integrated in the belt strap 10. The upper end of the diagonal region of the belt strap 10 is fastened to the gas generator 26 stationarily connected with the vehicle. The belt strap 10 extends downward behind the seat backrest and is guided around a tension roller 30. The two ends of the tension roller 30 are guided in guide rails (not shown) By its own weight, the tension roller 30 can hold the belt strap in a tensioned condition, or a spring can additionally be assigned to the tension roller 30. The tension roller 30 is shown in a lower normal position and in an upper position which it takes up when the occupant bends forward. In this embodiment, the withdraw able belt length is twice as long as the displacement path of the tension roller 30.

Figure 5:
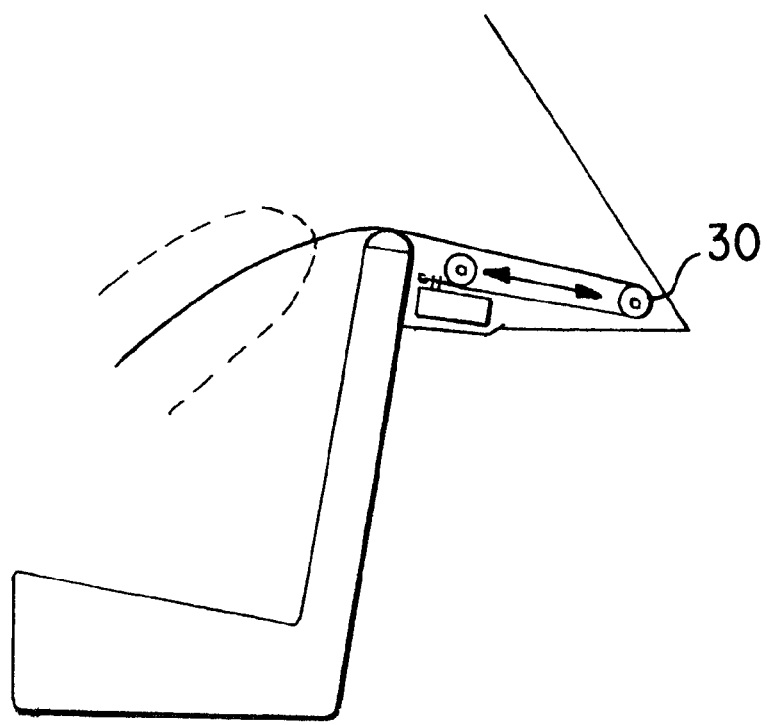
FIG. 5 is a view of a modification of FIG. 4.

The modification illustrated in FIG. 5 differs from FIG. 4 in that the tension roller 30 is approximately horizontally displaceably guided. The tension roller 30 is shown in a rearward normal position and in a forward position which it takes up when the occupant bends forward and withdraws the belt strap 10. The embodiment according to FIG. 5 is particularly suitable for t he rear s eat s of a vehicle.

Figure 6:
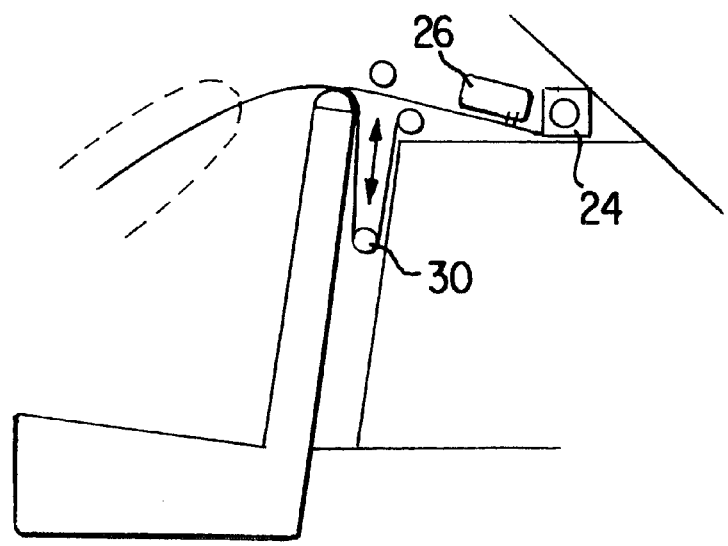
FIG. 6 is a schematic lateral view of a seat with an assigned seat belt and a movably arranged gas generator.

The embodiment illustrated in FIG. 6 is a combination of the embodiments of FIGS. 3 and 4. Here, the tension roller 30 only has the function of bringing the belt strap 10 into the parking position after the occupant has opened the belt buckle. When the occupant puts on the seat belt and the latter is tensioned by the upper retractor 24, the tension roller 30 takes up the upper position. In contrast to the embodiment of FIG. 4, the tension roller 30 does not have to be constructed to be load bearing in this embodiment.

Figure 7:
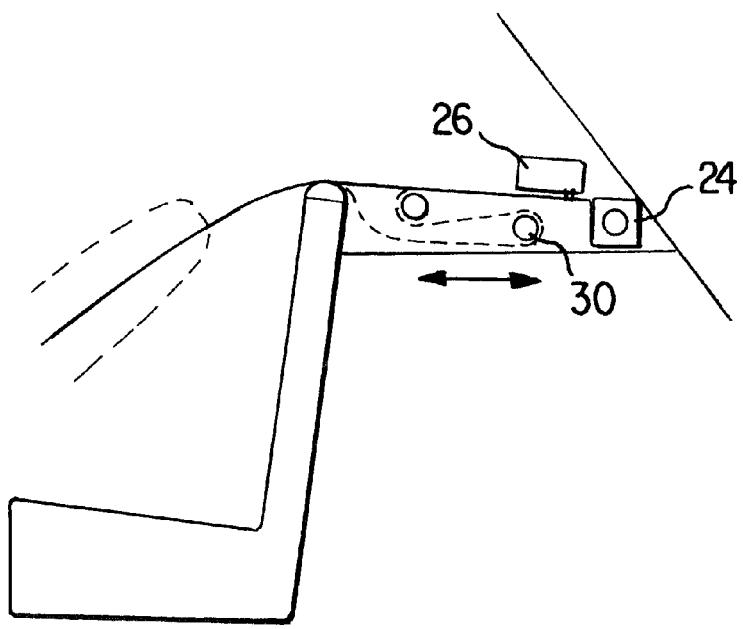
FIG. 7 is a view of a modification of FIG. 6.

In the embodiment according to FIG. 7, the tension roller 3 can move horizontally. The course of movement of the belt strap 10 in the parking position is illustrated by dash-dotted lines. This embodiment is particularly suitable for the rear seats of a vehicle.

Figure 8:
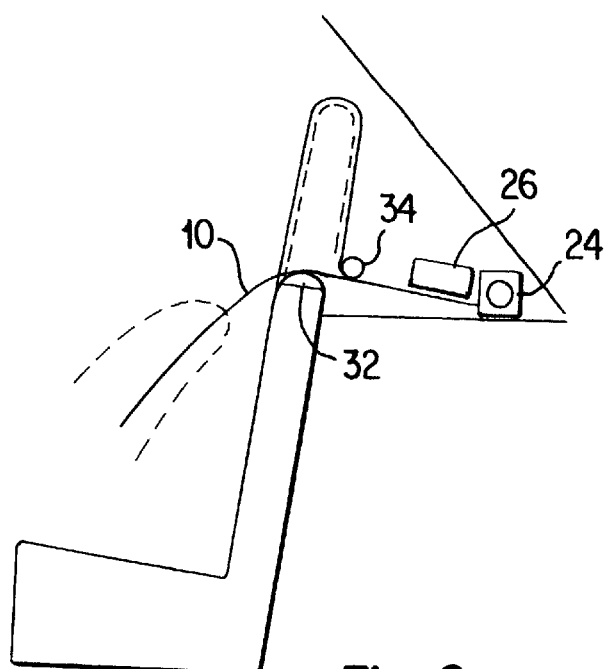
FIG. 8 is a view of a modification of FIG. 5.

In the embodiment illustrated in FIG. 8, which is a modification of the embodiment of FIG. 6, the belt deflection fitting 32 acts as a tension roller. By means of a mechanism (not shown), the belt deflection fitting 32 can be moved upward with respect to a deflection roller 34 in order to bring the belt strap 10 into the parking position.

Figure 9:
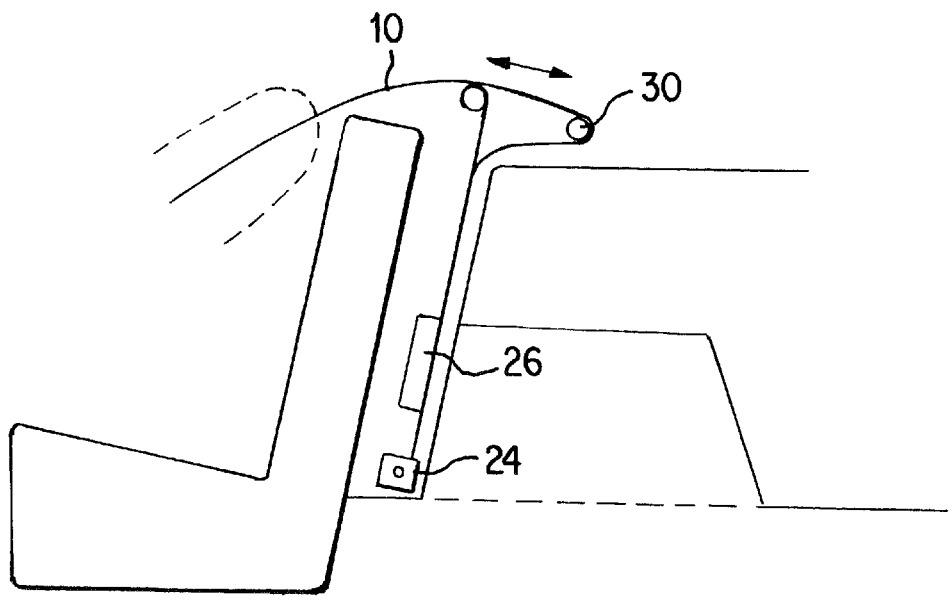
FIG. 9 is a view of another modification of FIG. 6.

FIG. 9 shows a modification of the embodiment of FIG. 2, in which the belt strap 10 is guided in the upper region around a tension roller 30. More precisely, a bearing block is arranged on the rear window shelf in which the tension roller 30 can be displaced horizontally toward the rear for storing the belt strap 10. When an occupant puts on the seat belt and withdraws the belt strap 10 from the retractor 24, the tension roller 30 is moved into the forward position by way of a mechanism (not shown). After the seat belt was put on, the belt strap 10 will be wound up by the upper retractor 24, whereupon the tension roller 30 is moved into the rearward position. In this embodiment, a load-bearing storage device and a large deflection of the belt strap can easily be implemented.

Figure 10A:
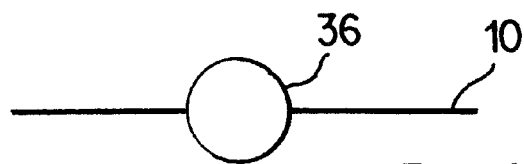
FIGS. 10a to 10d are cross-sectional views of the seat belt, the gas feeding hose and a deflection roller.
Figure 10B:
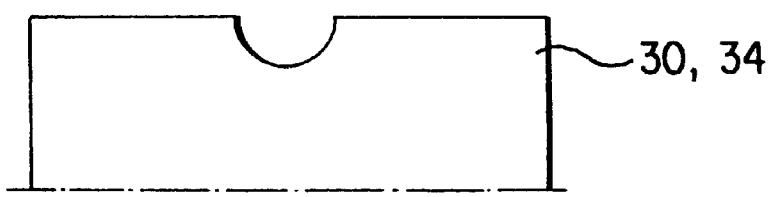

In the embodiments explained above in FIGS. 2 to 9, the belt strap is guided around a roller 30 or 34 and in the process is pressed against the roller by means of a relatively large force. When the gas feeding hose integrated in the belt strap 10 is arranged eccentrically with respect to the belt strap, it is possible that, in the event it is loaded, the gas feeding hose may be flattened. In order to avoid this possibility, it is provided according to FIG. 10a that the gas feeding hose 36 is placed into the neutral fiber of the belt strap 10 and that, according to FIG. 10b, a circumferential groove 38 is constructed in the roller 30 or 34 for receiving the gas feeding hose.

Figure 10C:
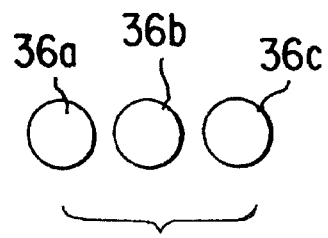
Figure 10D:
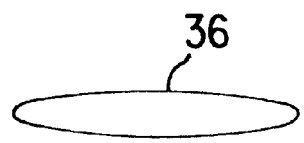

So that damage to the gas feeding hose by deformation is avoided, its deflection radius should amount to at least 5 times its diameter. In order to achieve a deflection radius of the gas feeding hose which is as small as possible while the hose cross-section is the same, the gas feeding hose according to FIG. 10c can be divided into three hoses 36a, 36b, 36c of a smaller diameter arranged side-by-side. However, as illustrated in FIG. 10d, it is also possible to flatten the gas feeding hose 36 in this cross-section, for example, to form it in an elliptical shape.

Figure 11A:
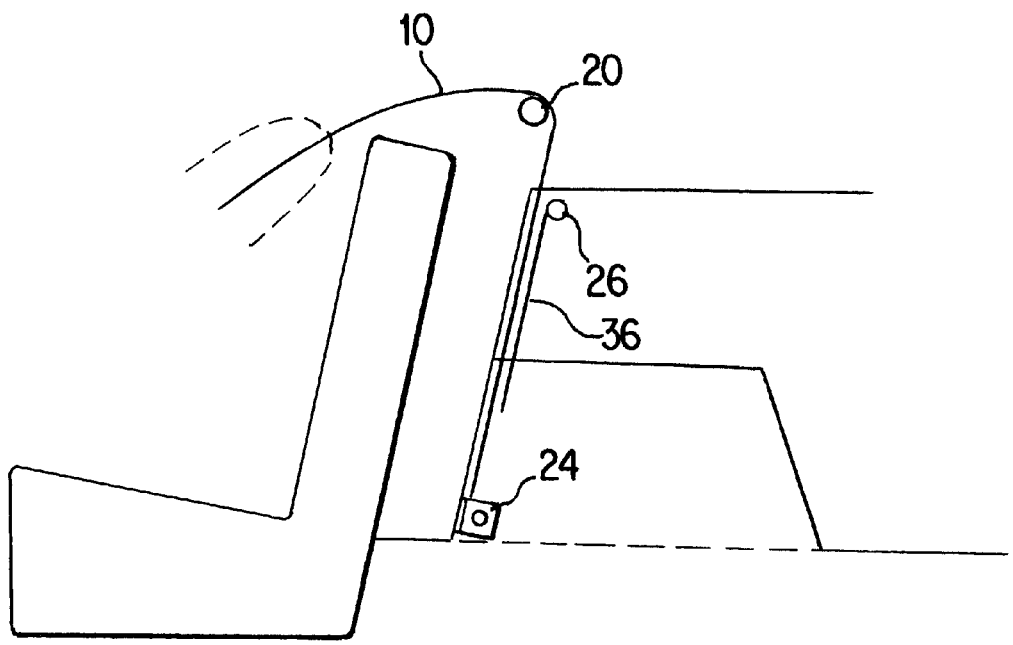
FIG. 11a and 11b are a schematic lateral view and a frontal view of a seat with an assigned seat belt, the air bag being connected with the stationary gas generator by way of a separate gas feeding hose.
Figure 11B:
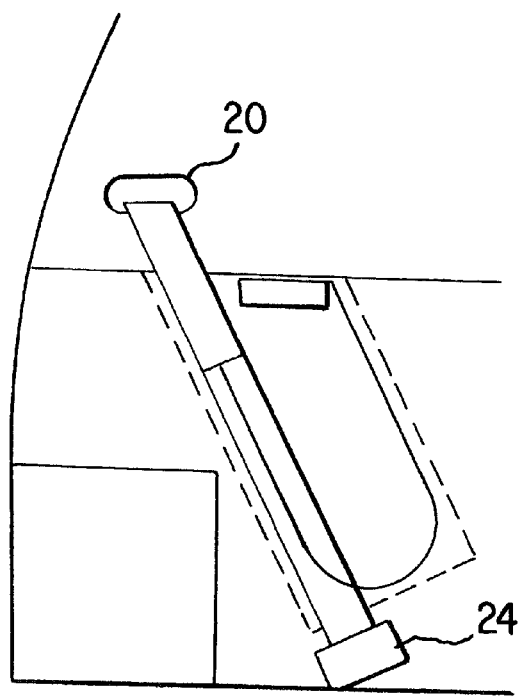

In the embodiment illustrated in FIGS. 11a and 11b, the gas feeding hose 36 is constructed separately from the belt strap 10 and is connected with a stationarily arranged gas generator 26. So that the belt strap 10 can be brought into the parking position, the distance between the retractor 24 and the belt deflection fitting 20 should be approximately 580 mm. The gas generator 26 is fastened at a short distance below the belt deflection fitting 20 on the vehicle, and the gas feeding hose 36 extends in a U-shape between the gas generator 26 and the belt deflection fitting 20. The retractor 24 is locked until the belt latch is inserted into the belt buckle and will be released after the belt is put on. When the belt strap 10 is withdrawn, it takes along the gas feeding hose 36, the withdrawn length being distributed to the two legs of the "U".

Figure 12:
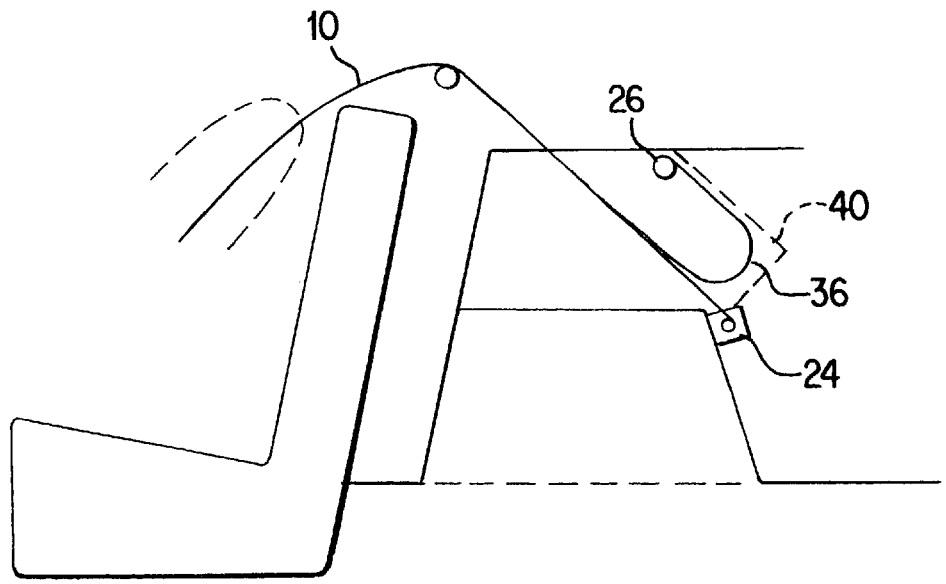
FIG. 12 is a view of a hinged mechanism for guiding the gas feeding hose.

In the embodiment illustrated in FIG. 12, the gas feeding hose 36 is also constructed in the upper area separately from the belt strap 10. The gas feeding hose 36 is guided by way of a hinge mechanism formed by a tube 40.

Figure 13:
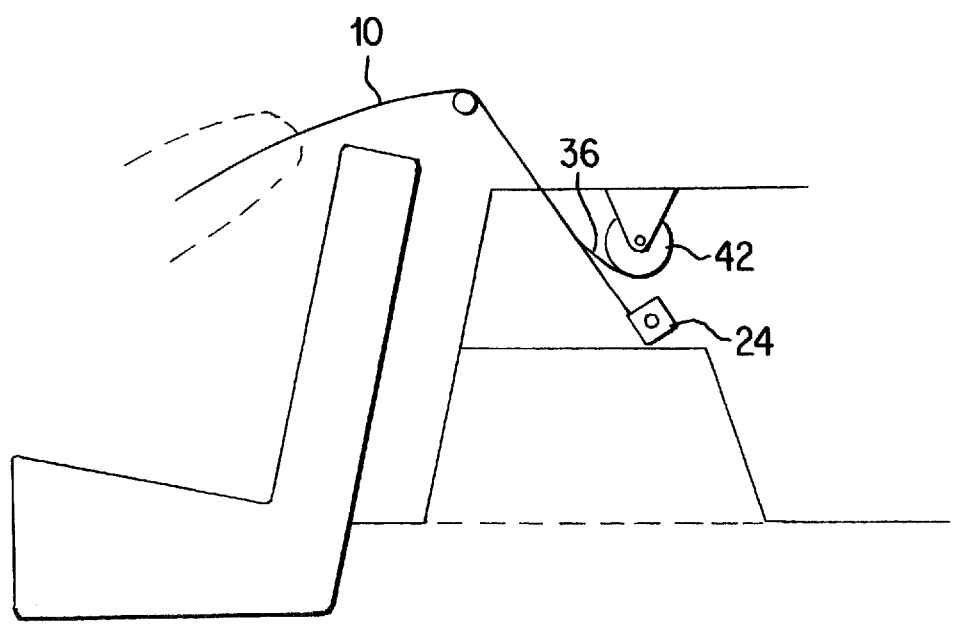
FIG. 13 is a view of a drum for winding up the gas feeding hose.

In the embodiment illustrated in FIG. 13, the gas feeding hose 36, which is constructed separately from the belt strap 10, is wound onto a drum 42 fastened to the vehicle. This embodiment permits a considerable forward displacement of an occupant's upper body in a simple construction.

Figure 14A:
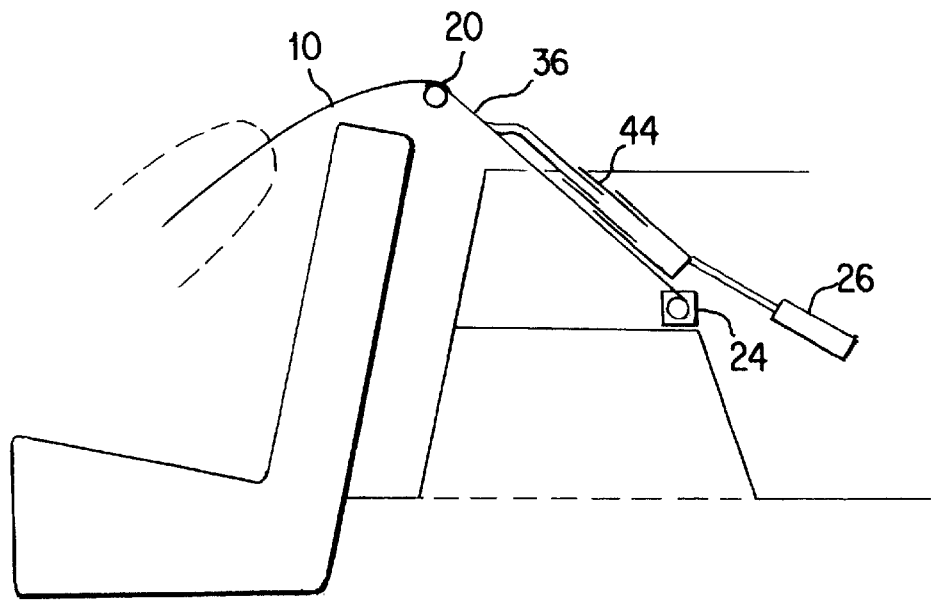
FIGS. 14a and 14b are schematic representations of a gas feeding hose whose length can be changed.
Figure 14B:
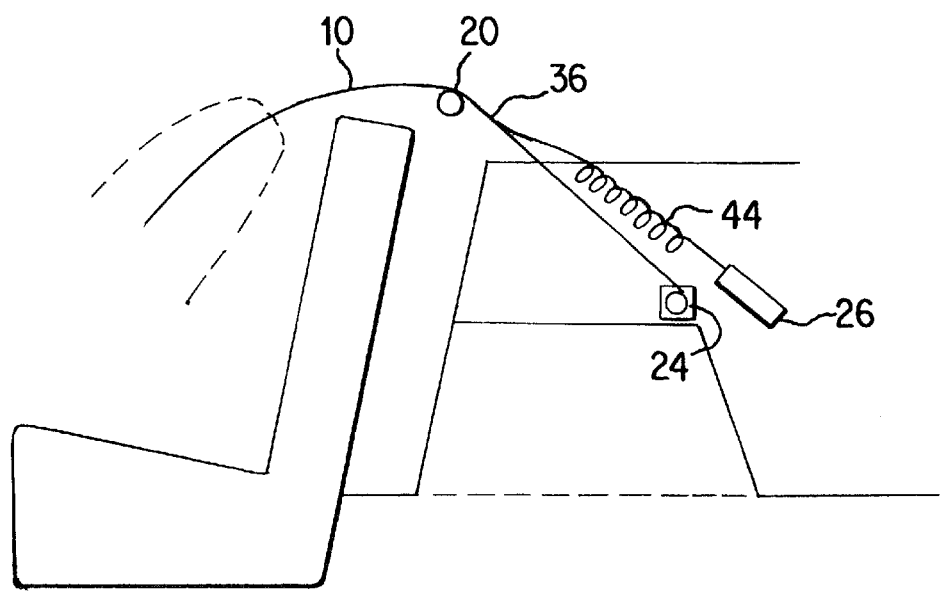

In the embodiments illustrated in FIGS. 14a and 14b, the guiding of the gas feeding hose 36 required for putting the seat belt on an occupant and for the forward displacement of the occupant is achieved by changing the length of the gas feeding tube 36. For this purpose, the gas feeding hose 36 can be constructed in the region between the belt deflection fitting 20 and the gas generator 26 as a telescopic tube 44 or as a spiral hose 46.

This embodiment is distinguished by a simple construction and by a low inert mass in the belt system. In addition, the spiral hose 46 acts as a pull-back spring and promotes the wind-up operation of the retractor 24.

Figure 15:
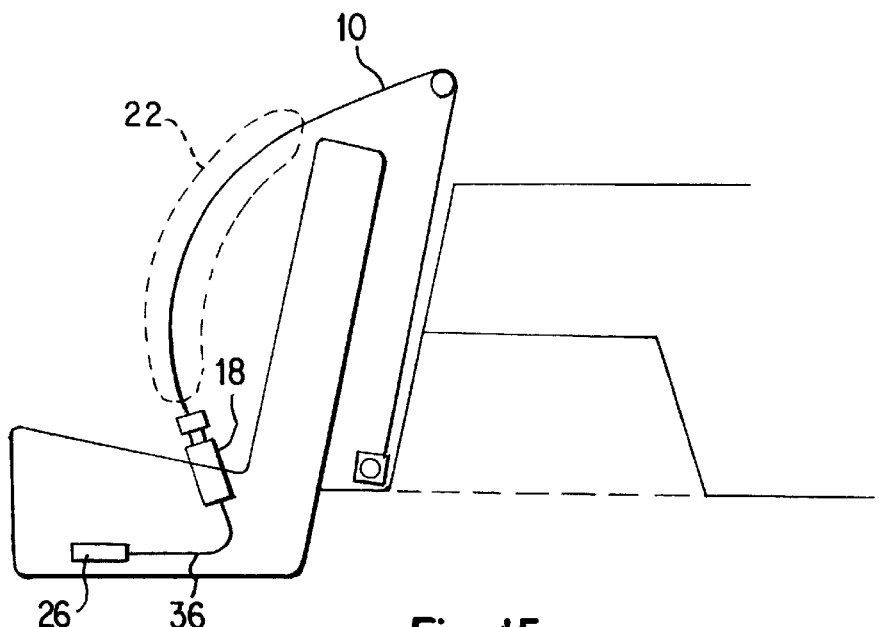
FIG. 15 is a schematic lateral view of a seat with an assigned seat belt in which the air bag is inflated by way of the belt buckle.
Figure 16:
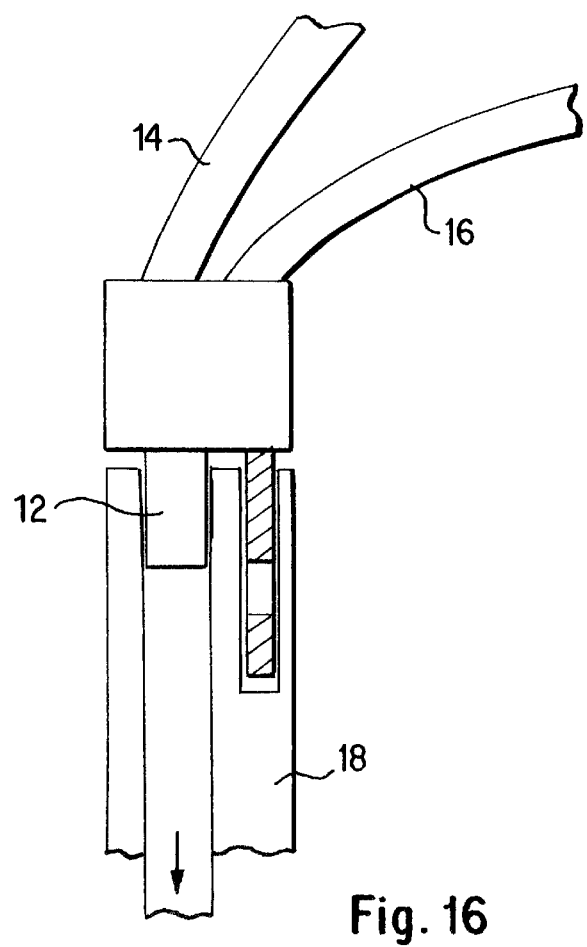
FIG. 16 is a schematic representation of the belt buckle constructed for the gas supply.

In the case of the seat belt illustrated in FIG. 15, the air bag 22 is inflated from below by way of the belt buckle 18. For this purpose, the gas generator 26 is connected by way of a gas feeding hose 36 with the belt buckle 18. In this embodiment, an inflatable air bag can be assigned to the diagonal region 14 as well as to the horizontal region 16 of the belt strap, which can both be inflated either by way of a bypass or directly by the belt buckle 18, as illustrated in FIG. 15.

Figure 17:
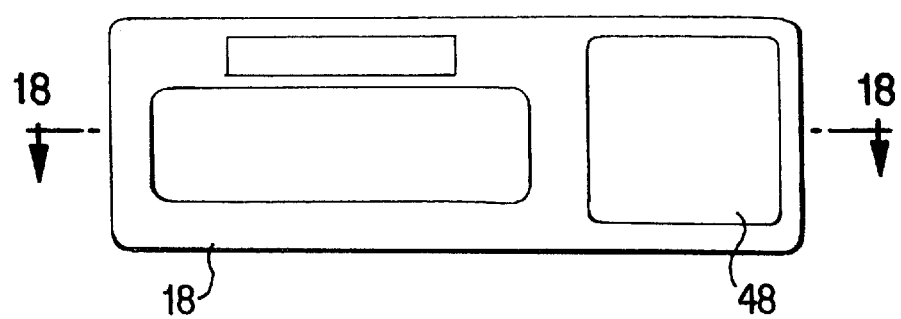
FIG. 17 is a top view of the belt buckle according to FIG. 16.
Figure 18:
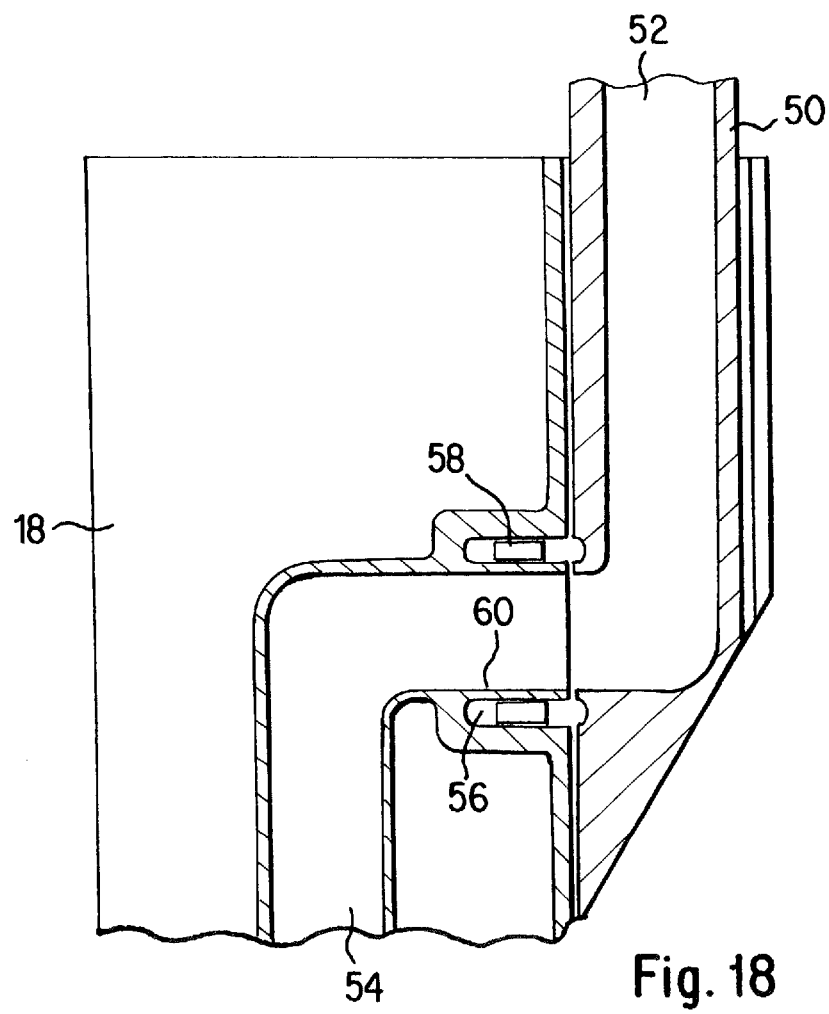
FIG. 18 is a sectional view according to Line A—A in FIG. 17.

FIGS. 17 and 18 show a particularly advantageous construction of a gas-tight connection between the belt latch 12 and the belt buckle 18. The belt buckle 18 is provided with an opening 48 for receiving a hollow extension 50 of the belt latch 12. The extension 50 of the belt latch 12 and the belt buckle 18 are each provided with a bent gas duct 52 and 54. When the belt latch 12 is inserted into the belt buckle 18, the two gas ducts 52 and 54 are connected with one another, as illustrated in FIG. 18. Because the gas transition from gas duct 54 to gas duct 52 is arranged horizontally, contaminations can be avoided in this region. In the mouth area of the gas duct 54, the belt buckle 18 is provided with a ring groove 56 into which a cylindrical seal 58 is inserted. By way of radial bores 60, the ring groove 56 is connected with the gas duct 54. When the gas generator is triggered, the rearward face of the seal 58 is acted upon by the gas pressure, so that its forward face is pressed in a gas-tight manner against a corresponding counterface of the extension 50 of the belt latch 12. For reducing space requirements, the gas ducts 52 and 54 can be combined with the locking mechanism of the belt buckle.

Figure 19:
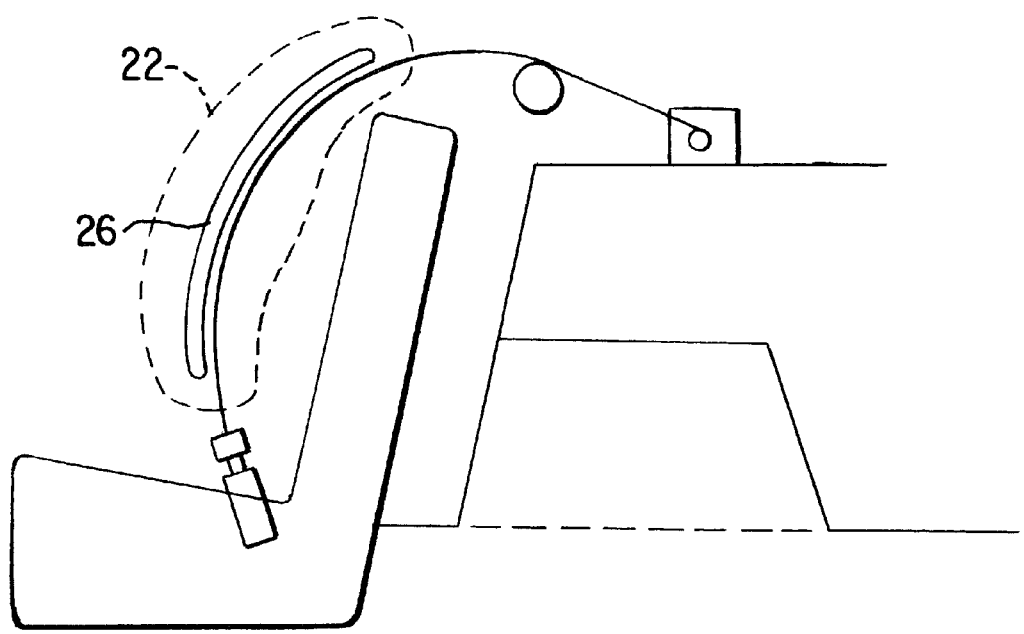
FIG. 19 is a schematic lateral view of a seat with an assigned seat belt, the gas generator being integrated in the air bag.

In the embodiment of an inflatable seat belt illustrated in FIG. 19, the gas generator 26 is integrated in the air bag 22. The gas generator 26 consists of a flexible material which burns off in a defined manner in the event of activation and releases gas. This embodiment has the advantage that a gas feeding hose is not required. When wearing the seat belt, an occupant can therefore bend forward to an arbitrary extent. Such an air bag provided with an integrated gas generator can also be assigned to the horizontal region of the belt strap.

Figure 20:
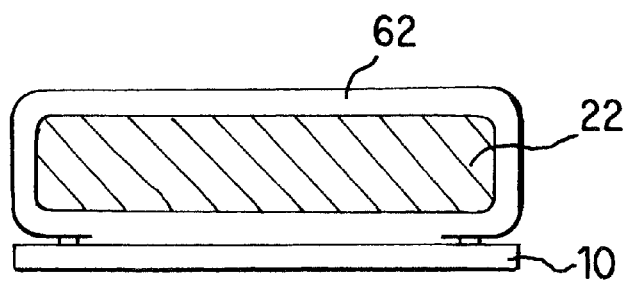
FIG. 20 is a cross-sectional view of the seat belt and the assigned air bag.

FIG. 20 is a cross-sectional view of the belt strap 10 and the folded air bag 22. The air bag 22 is provided with a cover band 62 whose two longitudinal edges are welded to the belt strap 10 so that a closed envelope is created. As a result of this envelope, the folded air bag 22 will be centered and prevented from rotating, and can be installed under prestress. As illustrated in FIG. 20, the two welded-together longitudinal edges of the cover band 62 are covered by the air bag 22. The cover band 62 is provided with a defined tear seam (not shown).

Figure 21:
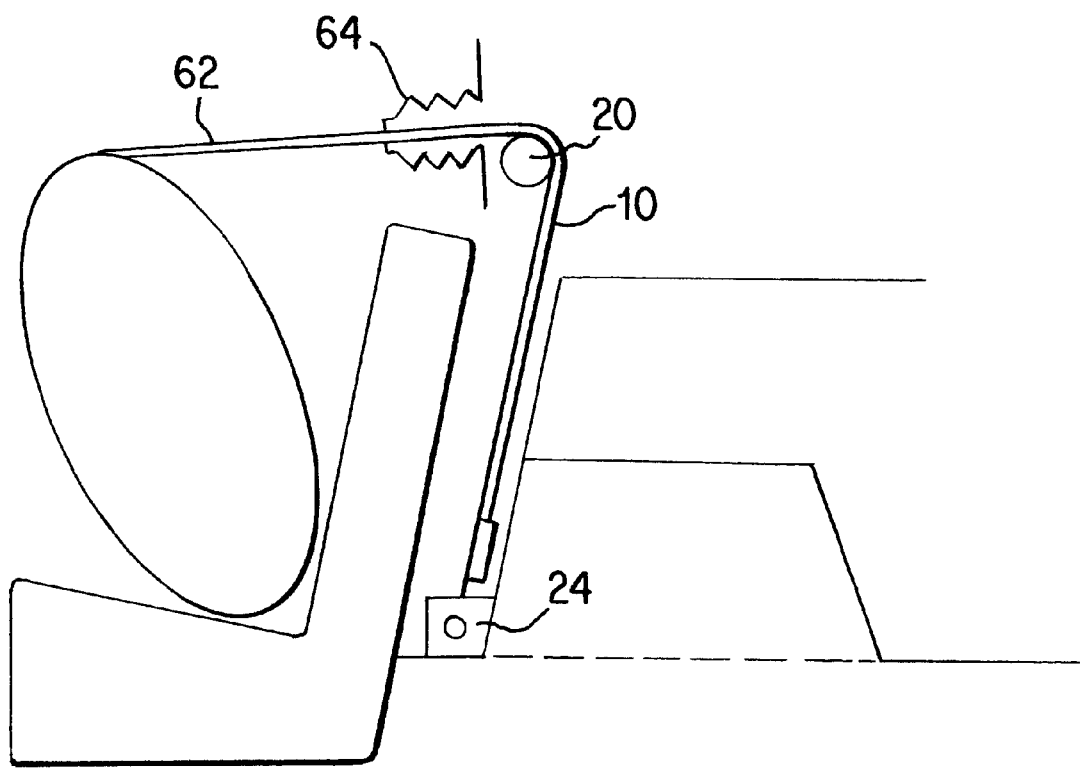
FIG. 21 is a schematic lateral view of a seat with an assigned seat belt and expansion bellows surrounding the gas feeding hose.

When the occupant bends forward and withdraws the diagonal region of the belt strap from the retractor, a region of the belt strap and possibly of the gas feeding hose may be exposed and not be covered by the envelope. As illustrated in FIG. 21, expansion bellows 64 are provided in order to prevent this from occurring. When, during the withdrawal of the belt strap 10 from the retractor 24, the end of the envelope is pulled over the belt deflection fitting 20, this end, by means of a (not shown) mechanism, will take along the expansion bellows 64 which will surround the gas feeding hose. The gas feeding hose is therefore protected by the expansion bellows 64.

Figure 22:
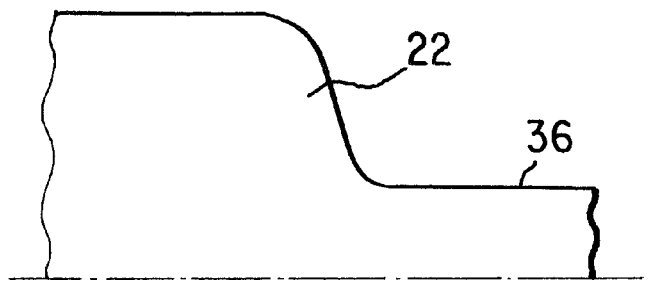
FIG. 22 is a schematic longitudinal sectional view of the air bag and the gas feeding hose connected with the latter in one piece.

The gas feeding hose can be inserted in the air bag 22 and be connected with the latter in a gas-tight manner. However, such an embodiment results in considerable resistance when the belt strap is withdrawn. In order to bypass this, it is useful to construct the gas feeding hose 36 with the air bag 22 as a one-piece component, as illustrated in FIG. 22. The air bag 22 and the gas feeding hose 36 can be woven in one piece, for example, of a temperature resistant material.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An inflatable seat belt for securing an occupant in a motor vehicle comprising:
   a belt strap comprising two ends connected with the motor vehicle;
   a belt latch arranged on the belt strap and dividing the belt strap into (i) a diagonal region for resting against an occupant's upper body and (ii) a horizontal region for resting against an occupant's pelvis;
   a belt buckle arranged on the vehicle onto which the belt latch is detachably connectable;
   a first retractor arranged on the motor vehicle onto which an end corresponding with the diagonal region of the belt strap is connected;
   a second retractor arranged on the motor vehicle onto which an end corresponding with the horizontal region of the belt strap is connected;
   an air bag arranged on the diagonal region of the belt strap so as to extend substantially from an occupant's upper body to an area behind an occupant's head, the air bag comprising a material which is shortened in an axial direction of the air bag during inflation;
   a clamping fastener detachably connecting the belt strap with the belt latch with a defined holding force;
   wherein the clamping fastener and the first retractor are electrically controllable such that (i) the first retractor and the clamping fastener are released, (ii) after a withdrawal of a defined length of the belt strap by the occupant, the first retractor is locked, (iii) after an insertion of the belt latch into the belt buckle, the clamping fastener is locked and the first retractor is released, and (iv) in the event of an impact of the vehicle, the clamping fastener is released.

2. The inflatable seat belt according to claim 1, wherein a gas generator is connected with the air bag.

3. The inflatable seat belt according to claim 2, wherein the air bag is actuatable in the event of an impact of the vehicle when the belt latch is not connected with the belt buckle.

4. The inflatable seat belt according to claim 2, comprising a child seat detection system which locks the upper retractor and prevents a triggering of the gas generator when a child seat is detected.

5. The inflatable seat belt according to claim 2, wherein the gas generator is connected by way of a gas feeding hose with the end of the belt strap corresponding to the diagonal region.

6. The inflatable seat belt according to claim 5, wherein the gas feeding hose is integrated in the belt strap.

7. The inflatable seat belt according to claim 6, wherein the gas generator is connected with the belt strap and is guided on a guide rail fastened to the vehicle.

8. The inflatable seat belt according to claim 6, wherein the gas generator is connected with the vehicle, and the belt strap is arranged around a movably disposed tension roller.

9. The inflatable seat belt according to claim 5, wherein the gas generator is connected with the vehicle and, by way of a separate gas feeding hose, is connected with the air bag, the gas feeding hose permitting a change in distance between an upper end of the air bag and the gas generator.

10. The inflatable seat belt according to claim 2, wherein the gas generator is connected by way of the belt buckle and the belt latch with a lower end of the air bag.

11. The inflatable seat belt according to claim 2, wherein the gas generator is integrated in the air bag.

12. The inflatable seat belt according to claim 6, wherein the gas feed hose is arranged in a neutral fiber of the belt strap.

13. The inflatable seat belt according to claim 12, wherein the belt strap is guided around a roller, the roller having a circumferential groove adapted to correspond to the profile of the gas feeding hose.

14. The inflatable seat belt according to claim 12, wherein the gas feeding hose has a flat profile.

15. The inflatable seat belt according to claim 14, wherein the gas feeding hose comprises a plurality of individual hoses situated side-by-side.

16. The inflatable seat belt according to claim 10, wherein a horizontal gas transition is provided in the belt buckle below the inserted belt latch.

17. The inflatable seat belt according to claim 16, wherein a seal is arranged at the gas transition, the seal resting on a sealing surface under a pressure from the gas flow.

18. The inflatable seat belt according to claim 1, wherein, in a folded condition, the air bag is surrounded by an envelope.

19. The inflatable seat belt according to claim 18, wherein the envelope comprises the belt strap and a cover band having longitudinal sides, at least one longitudinal side of the covering band covering the air bag being welded to the belt strap.

20. The inflatable seat belt according to claim 19, wherein a rearward end of the envelope facing away from the air bag is connected with an expansion bellows which surrounds a gas feeding hose.

21. The inflatable seat belt according to claim 5, wherein the gas feeding hose and the air bag are woven in one piece.

22. A method for securing an occupant in a motor vehicle comprising:
   providing a belt strap comprising two ends connected with the motor vehicle;
   providing a belt latch on the belt strap which divides the belt strap into (i) a diagonal region for resting against an occupant's upper body and (ii) a horizontal region for resting against an occupant's pelvis;
   providing a belt buckle on the vehicle onto which the belt latch is detachably connectable;
   providing a first retractor on the motor vehicle onto which an end corresponding with the diagonal region of the belt strap is connectable;
   providing a second retractor arranged on the motor vehicle onto which an end corresponding with the horizontal region of the belt strap is connectable;
   providing an air bag on the diagonal region of the belt strap so as to extend substantially from an occupant's upper body to an area behind an occupant's head, the air bag comprising a material which is shortened in an axial direction of the air bag during inflation;
   providing a clamping fastener on the belt latch which connects the belt strap with the belt latch with a defined holding force;
   electrically controlling the clamping fastener and the first retractor in the following order:
      (i) releasing the first retractor and the clamping fastener;
      (ii) after a withdrawal of a defined length of the belt strap by the occupant, locking the first retractor;
      (iii) after an insertion of the belt latch into the belt buckle, locking the clamping fastener and releasing the first retractor; and
      (iv) during an impact of the vehicle, releasing the clamping fastener.

* * * * *